United States Patent
Israni

(10) Patent No.: US 10,314,150 B2
(45) Date of Patent: Jun. 4, 2019

(54) WIRELESS LIGHT ASSEMBLY AND KIT

(71) Applicant: Trendstar Corporation, Fairfield, NJ (US)

(72) Inventor: Rajesh Israni, Fairfield, NJ (US)

(73) Assignee: TRENDSTAR CORPORATION, Fairfield, NJ (US)

( * ) Notice: Subject to any disclaimer, the term of this patent is extended or adjusted under 35 U.S.C. 154(b) by 0 days.

(21) Appl. No.: 16/138,165

(22) Filed: Sep. 21, 2018

(65) Prior Publication Data

US 2019/0132933 A1    May 2, 2019

Related U.S. Application Data

(63) Continuation-in-part of application No. 15/795,717, filed on Oct. 27, 2017, now Pat. No. 10,182,489.

(51) Int. Cl.
| | | |
|---|---|---|
| *H05B 37/02* | (2006.01) | |
| *F21V 23/00* | (2015.01) | |
| *F21V 23/02* | (2006.01) | |

(52) U.S. Cl.
CPC ....... *H05B 37/0272* (2013.01); *F21V 23/007* (2013.01); *F21V 23/023* (2013.01)

(58) Field of Classification Search
CPC ............. H05B 37/02; H05B 37/0027; H05B 37/0272; H05B 33/08; H05B 33/0842; F21V 23/007; F21V 23/023; F21V 15/01; F21K 9/20

See application file for complete search history.

(56) References Cited

U.S. PATENT DOCUMENTS

| | | | | |
|---|---|---|---|---|
| 5,526,243 A | * | 6/1996 | Masters | ............... F21V 17/02 362/122 |
| 5,962,982 A | * | 10/1999 | Mancuso | ............ F21V 21/0824 250/205 |
| 8,884,531 B1 | | 11/2014 | Xu | |
| 8,901,827 B1 | | 12/2014 | Xu | |
| 2005/0094387 A1 | | 5/2005 | Coman | |
| 2010/0296285 A1 | | 11/2010 | Chemel | |
| 2011/0062888 A1 | | 3/2011 | Bondy | |
| 2012/0134133 A1 | | 5/2012 | Kang | |
| 2012/0262928 A1 | | 10/2012 | Matsuda | |
| 2013/0030423 A1 | | 1/2013 | Reichert | |
| 2013/0342131 A1 | | 12/2013 | Recker | |
| 2015/0220109 A1 | | 8/2015 | von Badinski | |
| 2016/0313636 A1 | | 10/2016 | Chien | |
| 2016/0330825 A1 | | 11/2016 | Recker | |

* cited by examiner

*Primary Examiner* — Jimmy T Vu
(74) *Attorney, Agent, or Firm* — Leason Ellis LLP

(57) ABSTRACT

A wireless light kit includes a wireless light unit that comprises a housing having an interior compartment that contains a processor and a power source and a light source that is powered by the power source and operatively connected to the processor. The kit also includes two different types of mounting back plates, namely a first back plate and a second back plate. The first back plate is configured to mate with the housing and the second back plate is configured to mate with the housing so as to cover at least a portion of the rear face of the housing and further includes a stake extending outwardly therefrom and being configured for insertion into a ground surface for supporting the wireless light unit above the ground surface. An optional stake extender is provided to extend the length of the stake.

15 Claims, 14 Drawing Sheets

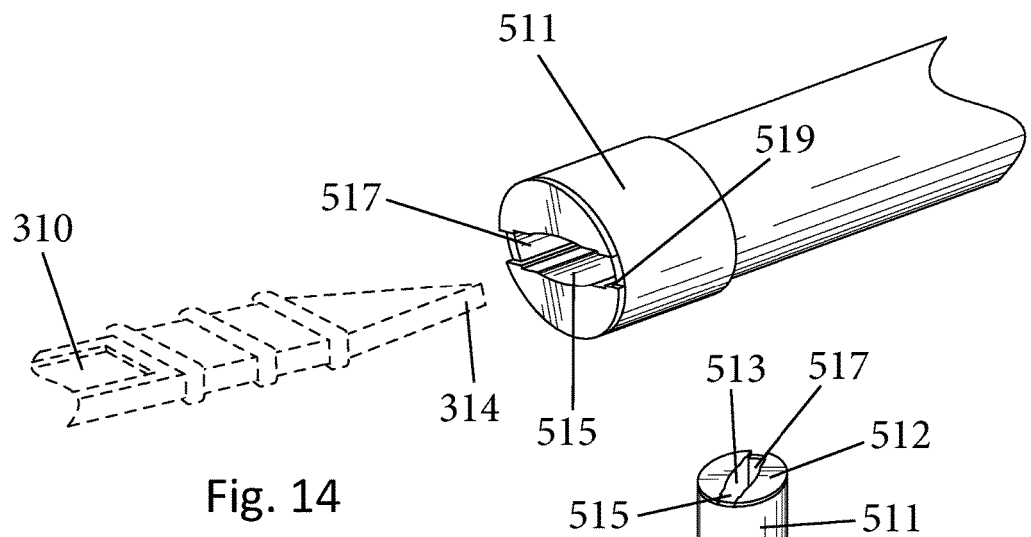
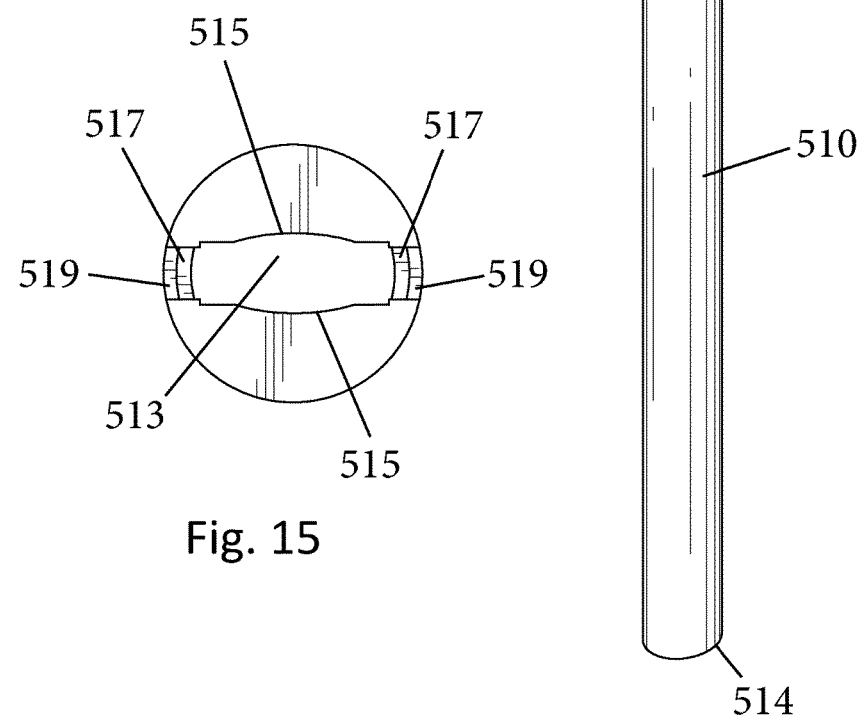
Fig. 14
Fig. 15
Fig. 13

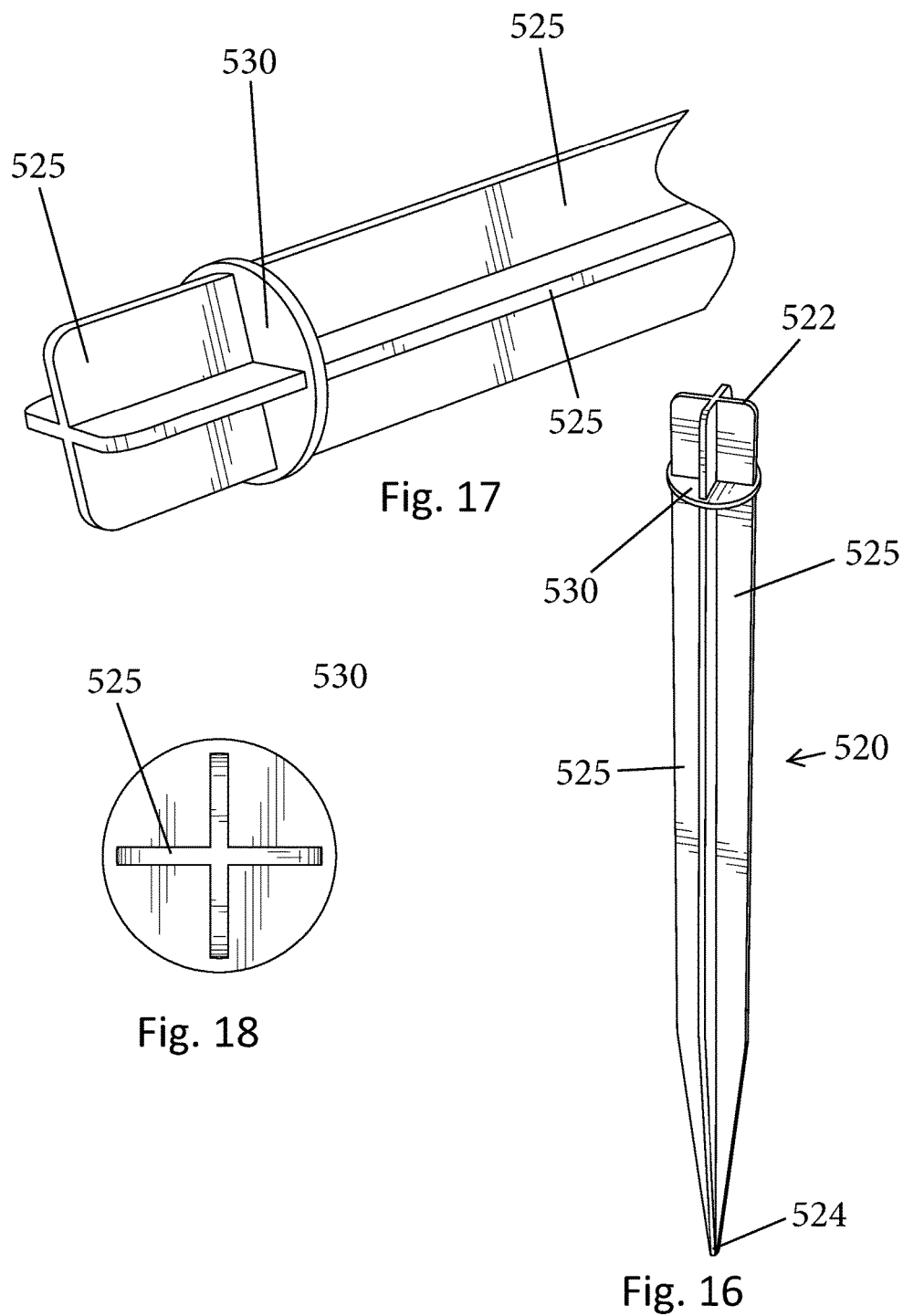

WIRELESS LIGHT ASSEMBLY AND KIT

CROSS-REFERENCE TO RELATED PATENT APPLICATIONS

This application is a continuation-in-part of U.S. Non-Provisional patent application Ser. No. 15/795,717, filed Oct. 27, 2017, the entire contents of which is incorporated by reference herein as if expressly set forth in its respective entirety herein.

TECHNICAL FIELD

The present invention is directed to the field of lighting and more particularly, to a wireless light assembly (a sensor device) and kit that is configured to direct light in a fixed direction and also is configured to be secured to both a support surface, such as a wall or stair, and to a stake for placement in the ground in an outdoor setting or in an indoor garden setting. The light assembly can also be actuated based on sensor information, such as sensing motion or sensing light or the lack thereof (such as a dusk to dawn setting).

BACKGROUND

There are many different types of lights that are commercially available and can be grouped according to their intended uses. For example, there is indoor lighting, outdoor lighting, specialty lighting, etc. Lighting can also be grouped by the power source in that many lights have an electric power source, such as a standard wall outlet; however, there are also many types of lighting that are battery powered.

Another class of lighting is motion activated lighting which can serve both a safety and security function. For example, motion activated lights can be used to guide a person in the middle of the night within the house or can be located outside to guide a person along a pathway or the like.

While there are many wireless motion activated lights on the market what is needed is an improved wireless light assembly/device that can be easily mounted to not only a support surface but also to a garden stake that allows placement within the ground at a select outdoor location.

SUMMARY

In accordance with one embodiment, a wireless light kit includes a wireless light unit that includes a housing having an interior compartment that contains electronics, a power source, and a light source. The wireless light unit also includes: (1) first back plate that is configured to mate with the housing so as to cover at least a portion of the rear face of the housing and provide a mounting surface for mounting to a support surface; and (2) a second back plate that is configured to mate with the housing so as to cover at least a portion of the rear face of the housing, the second back plate having a stake extending outwardly therefrom and configured for insertion into a ground surface for supporting the wireless light unit above the ground surface.

The wireless light unit also includes a stake extender including a first part that has a slot at a first end for receiving the stake and a second part that is configured to detachably coupled to the first part and has a tapered second end for insertion into the ground surface.

BRIEF DESCRIPTION OF THE DRAWING FIGURES

FIG. 13 is a perspective view of a first part of the stake extension;

FIG. 14 is a partial perspective view of one end of the first part and one end of the stake element;

FIG. 15 is a top plan view of the first part;

FIG. 16 is a perspective view of a second part of the stake extension;

FIG. 17 is a partial perspective view of one end of the second part; and

FIG. 18 is a top plan view of the second part.

DETAILED DESCRIPTION OF CERTAIN EMBODIMENTS

As previously mentioned and with reference to the accompanying drawings, the present invention relates to a wireless light assembly 100 that is configured for attachment to a support surface, such as a wall or a back of a stair, and also can be inserted into the ground when the optional stake type back plate is used as described herein.

Figure 1:
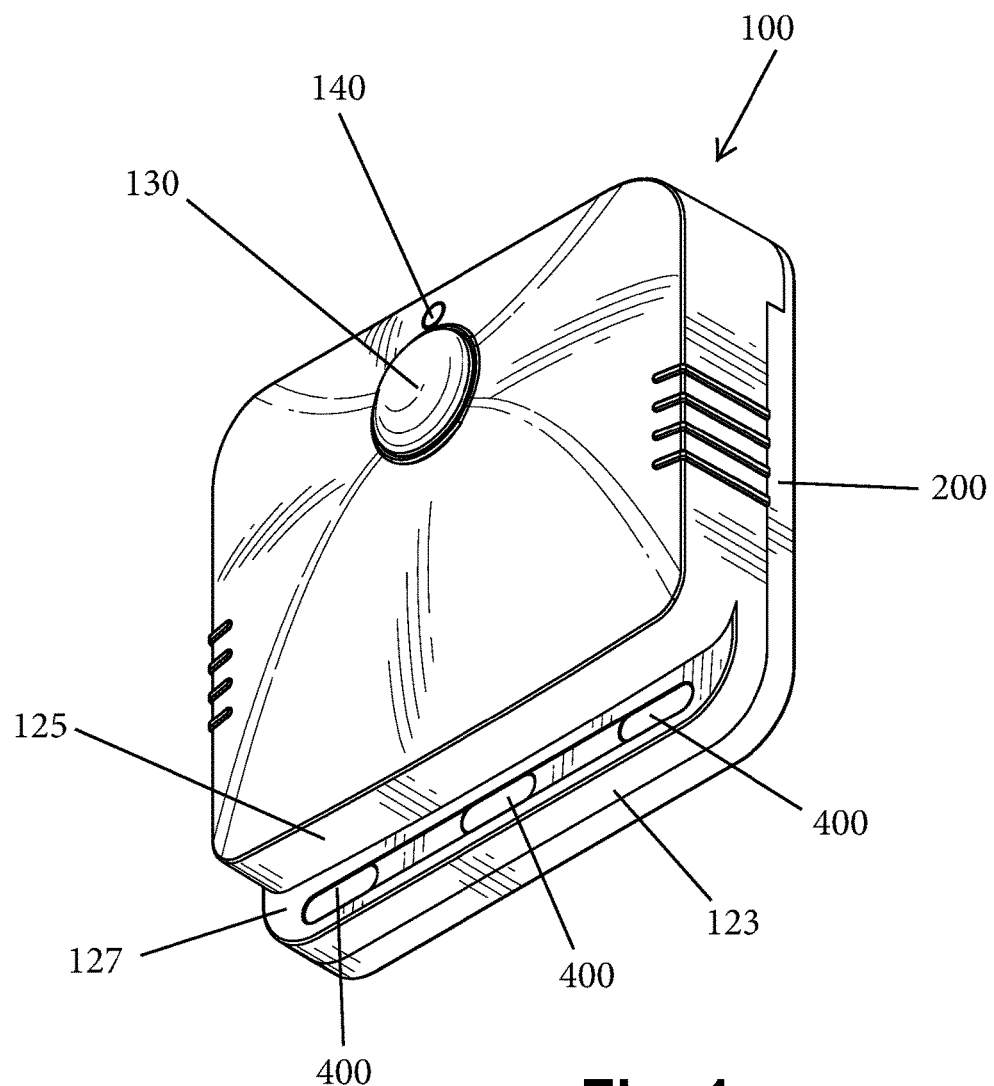
FIG. 1 is a front, bottom and side perspective view of a wireless light assembly (device) according to one embodiment of the present invention shown in its assembled state.
Figure 2:
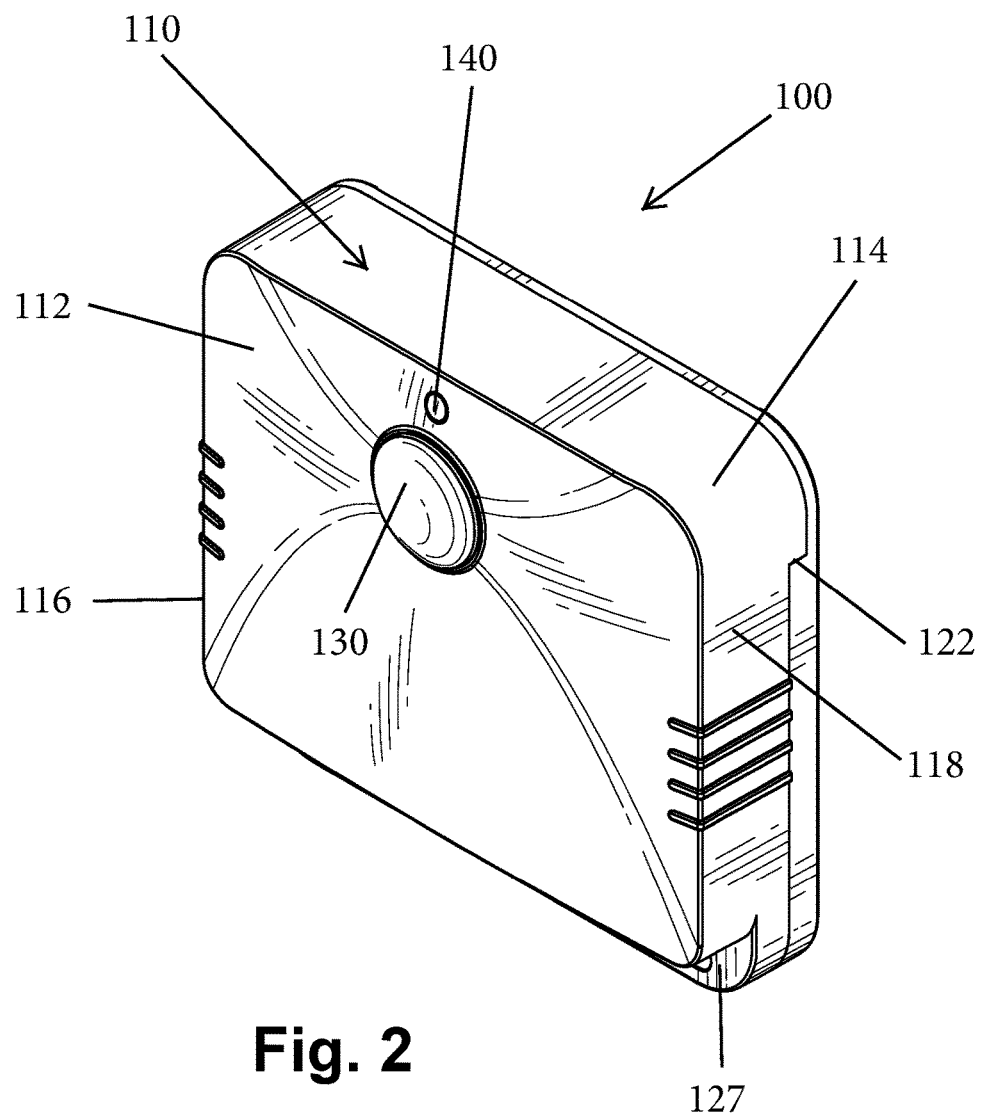
FIG. 2 is a front and side perspective view of the wireless light assembly.
Figure 3:
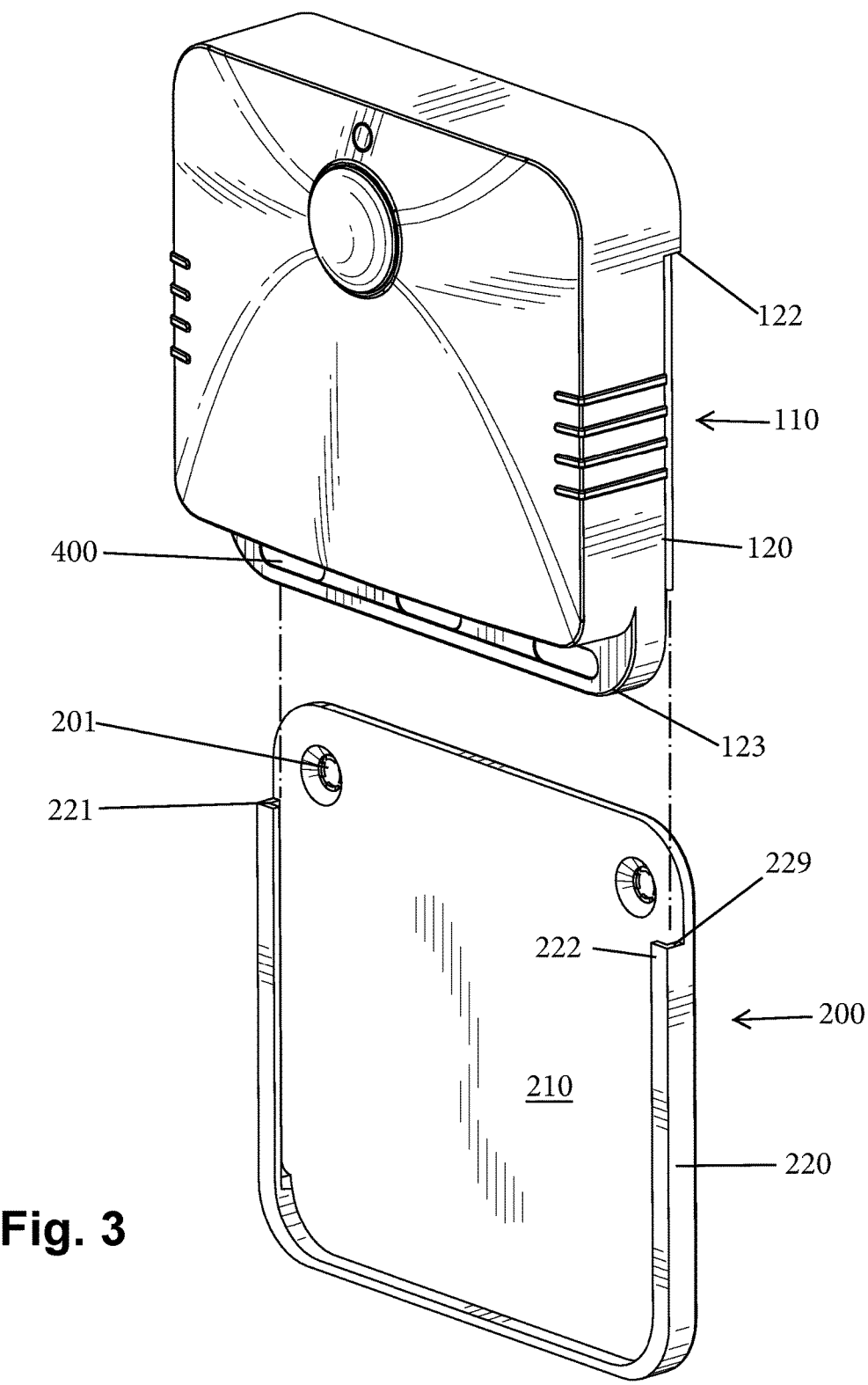
FIG. 3 shows a housing of the light assembly exploded from an attachable back plate.
Figure 4:
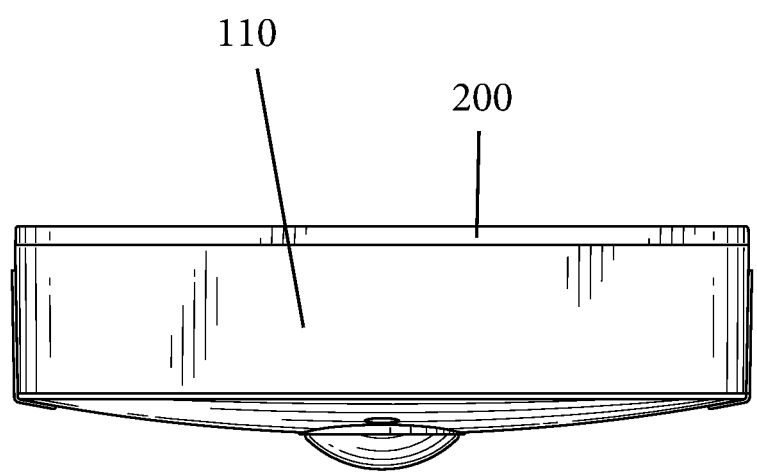
FIG. 4 is a top plan view of the light assembly.
Figure 5:
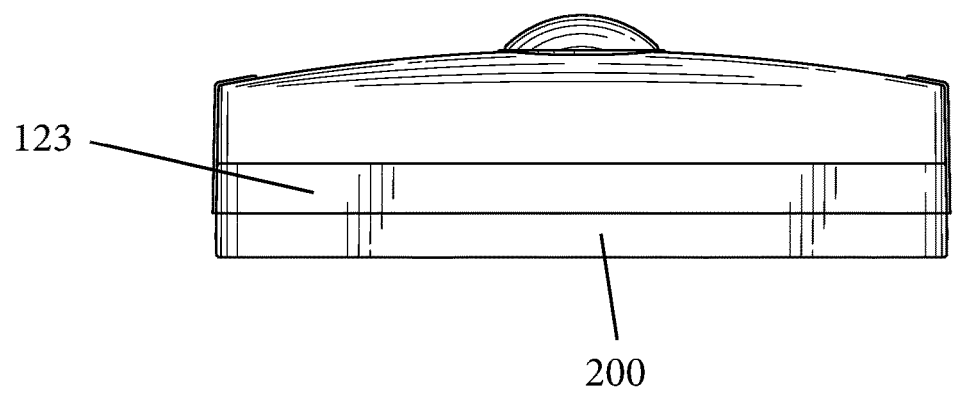
FIG. 5 is a bottom plan view of the light assembly.
Figure 6:
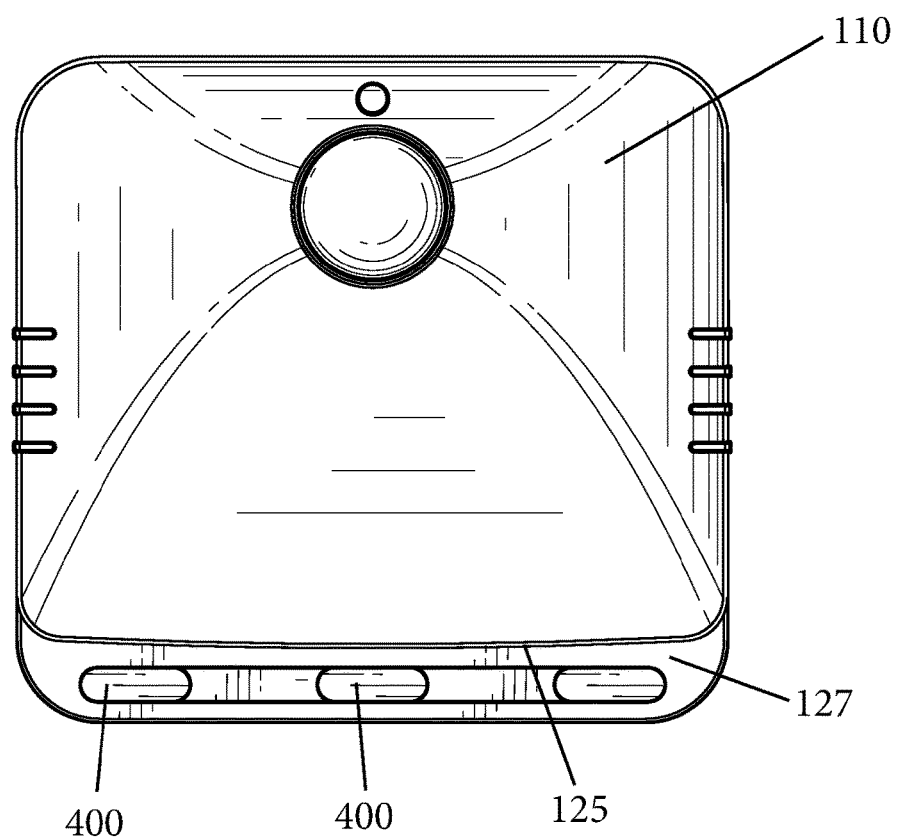
FIG. 6 is a front elevation view of the light assembly.
Figure 10:
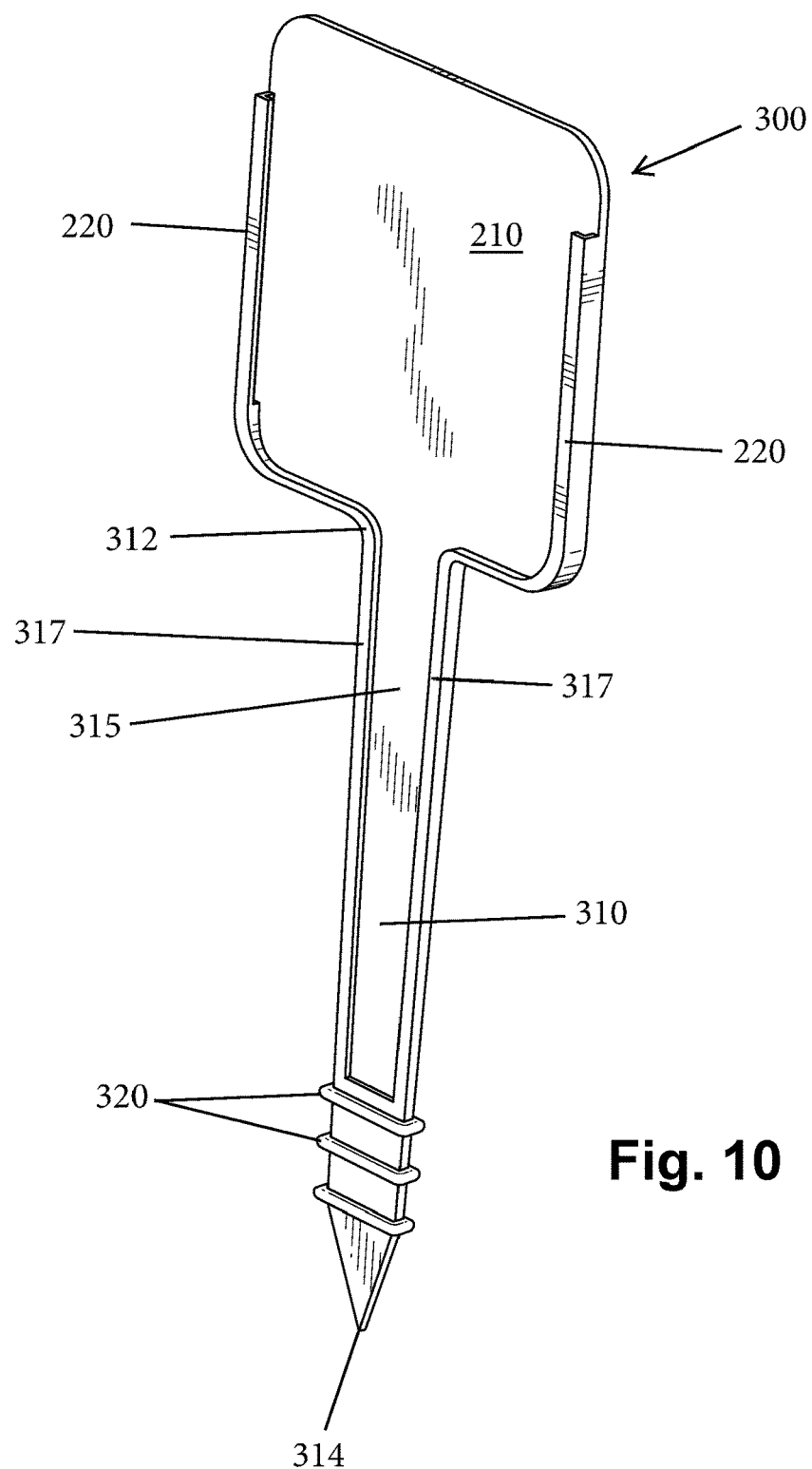
FIG. 10 is a perspective view of an alternative attachable back plate including an integral stake element.

The wireless light assembly 100 includes a main unit or housing 110 and an attachable back plate which can either be in the form of a simple back plate 200 as shown in FIG. 3 or can be in the form of a stake type back plate 300 shown in FIG. 10.

The main housing 110 is broadly the structure that houses all of the electronics and the power source. The main housing 110 is thus a sealable structure that includes a hollow interior compartment that contains the electronics and the power source.

In one embodiment, the main housing 110 has a front wall 112, a top wall 114, a first side wall 116 and a second side wall 118. While the main housing 110 is shown as having a generally square shape, it will be appreciated and understood that the main housing 110 can be formed to have any number of different shapes, including but not limited to a rectangle, etc. One or more of the corners of the main housing 110 can be curved.

As shown the front wall 112 can have a curved outer surface or it can be constructed so as to planar. Along rear edges of each of the side walls 116, 118, there is a notch or cutout 120 that serves as a guide as described herein. An upper end of the cutout 120 comprises a closed end in that there is a stop (wall) 122 located thereat. The cutouts 120 have a linear construction and are parallel to one another.

A bottom of the main housing 110 is configured to contain a light source 400 and as shown, the bottom can have a stepped construction in that a bottom wall 123 defines the bottommost portion of the main housing 110 and defines the rear face of the main housing 110. An inner wall 125 is also formed and is spaced from the bottom wall 123 and can be located parallel thereto. A right angled shoulder can be defined between the inner wall 125 and the bottom wall 123.

The bottom wall 123 can thus be thought of as defining a ledge 127 since it extends below the inner wall 125. The ledge 127 can be a planar surface that faces forwardly when the light assembly 100 is oriented vertically, which is a normal in-use position. In this vertical orientation, the inner wall 125 creates an overhang relative to the light source 400 which is located along the ledge 127 and more particularly, an underside of the inner wall 125 is positioned above the light source 400. For example, one or more lights 400, such as LEDs, can provided along the ledge 127 and oriented so as to project light in an outward (forward) direction from the ledge 127. In the illustrated embodiment, there are a plurality (e.g., three) of light sources (LEDs) 400 that are spaced across the ledge 127.

It will be understood that inner wall 125 is formed and positioned relative to the light source 400 so as provide a light deflection function. In particular, as light emanates from the light source 400 (e.g., LEDs), the light waves expand outwardly at different angles as the light waves travel away from the light source 400. As a result, some of the light waves from each LED contact the inner wall 125 (i.e., the underside thereof) and are deflected in a downward direction since the inner wall 125 acts as a deflector (barrier). This action is desirable since the light assembly 100 is intended to cast light outward to assist a person in seeing the area at which the light assembly 100 is mounted. For example, when the light assembly 100 is mounted along a staircase, it is intended to illuminate one or more stairs, when mounted in a closet, it is intended to illuminate the closet, when mounted in a hallway, it is intended to illuminate the floor, etc.

In this manner each LED 400 is designed to cast light not only forward but also in a downward direction so as to illuminate a greater area around the light assembly 100.

Figure 11:
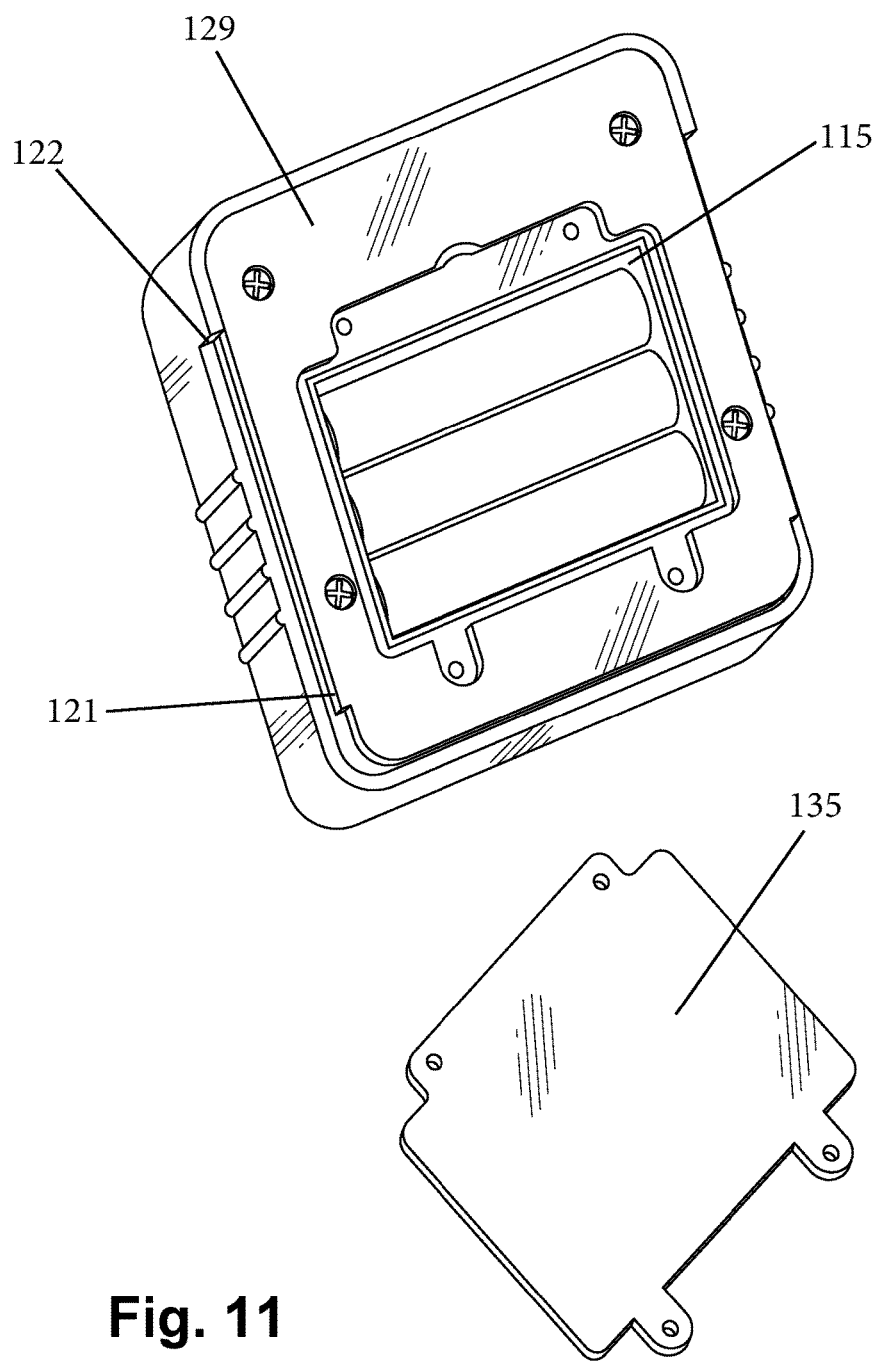
FIG. 11 is a rear perspective view of a housing of the wireless light assembly with a battery cover shown exploded therefrom.
Figure 12:
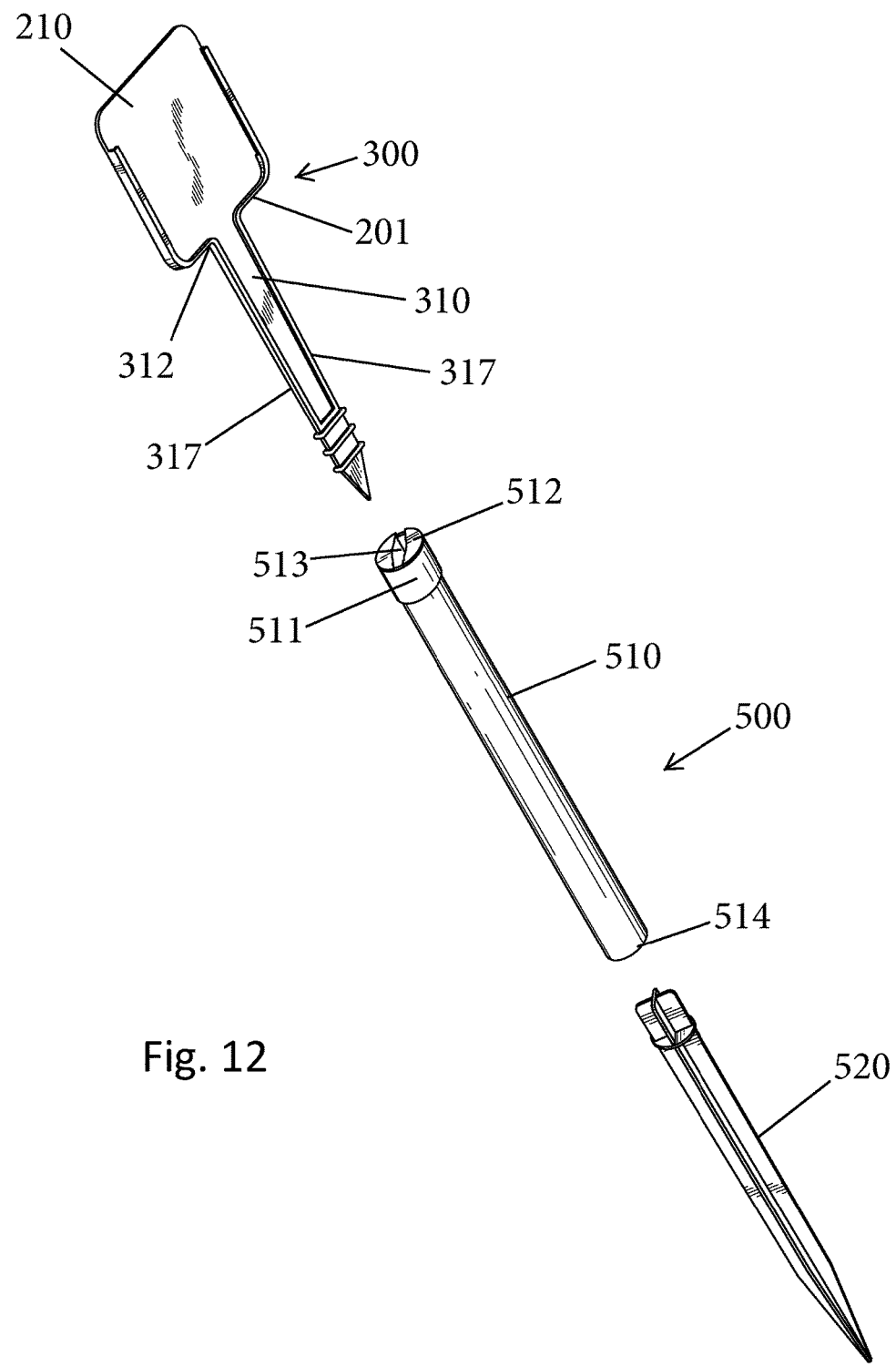
FIG. 12 is an exploded perspective view of the stake element of FIG. 10 along with a stake extension.

As shown in FIG. 11, a rear wall 129 of the main housing 110 can include a removable cover or panel 135 that provides access to a battery compartment 115 to allow for insertion and removal of the batteries 119. This cover/panel 135 can be attached to the housing 110 using any number of conventional techniques, including but not limited to the use of fasteners, such as screws, etc. The cover/panel 135 can be countersunk so that it is flush to the surrounding sections of the main housing 110 so as to provide a clean, planar rear face of the main housing 110. A seal member, such as a gasket or O-ring, can be provided as well to establish a seal between the cover/panel 135 and the main housing 110. Alternatively, the battery compartment 115 can be left open along the rear 129 of the main housing 110 and the back plate 200, 300 serves to close off and seal the battery compartment.

As mentioned, the hollow interior of the main housing 110 contains the electronics and power source. Exemplary electronics include but are not limited to a processor, such as a printed circuit board (PCB), wiring connecting the PCB to the power source which comprises one or more batteries 119. One or more switches, such as an on/off switch, are also provided. In addition, the electronics also preferably contain one or more sensors for actuating the light assembly 100 under select conditions. For example, when a motion sensor 130 is provided, the light assembly 100 will only turn on when motion is sensed in proximity to the motion sensor 130. The processor can be configured to power the light assembly and thereby illuminate a space for a select period of time (e.g., 30 seconds, 1 minutes, etc.) if no additional motion is sensed besides the initial motion that triggered the operation.

The light assembly 100 can also have a light sensor 140 that detects the light conditions surrounding the unit. The processor can be configured so that the light assembly 100 only operates when certain light conditions are detected by the light sensor 140 and more particularly, when the light sensor 140 detects low light or dark conditions. Thus, even if motion is detected by the motion sensor 130, if the light sensor 140 detects a threshold amount of light, the light assembly 100 will not operate, thereby conserving its power source since illumination by the light assembly 100 is not required in such observed conditions. The light sensor 140 can be any number of different types of commercially available light sensors, such as a photo cell, etc.

As shown, both the motion sensor 130 and the light sensor 140 are disposed along the front face of the front wall 112 and face outward therefrom.

As mentioned herein, the main housing 110 is configured to mate with two different back plates 200, 300 and can be supplied to the consumer as a kit in that the consumer is provided with a single package/box that contains a single main housing (unit) 110 along with one back plate 200 (FIG. 3) and one stake type back plate 300 (FIG. 10) which can be interchangeably used with the main housing 110.

As shown in FIG. 3, the back plate 200 has a rear wall 210 and a partial peripheral side wall 220 that extends along a portion of the rear wall 210. In the illustrated embodiment, the rear wall 210 has a square shape that is complementary to the shape of the main housing 110. The peripheral side wall 220 extends substantially along the two sides of the rear wall 210 and completely along the bottom of the rear wall 210 but is absent along the top of the rear wall 210.

The peripheral side wall 220 has a portion 221 that is perpendicular and integral to the rear wall 210 but also contains a lip 222 that extends inwardly from the portion 221 and thus faces the inside of the rear wall 210. A right angle is formed between the lip 222 and the portion 221. The peripheral side wall 220 can be curved in the two lower corners as shown.

The side sections of the peripheral side wall 220 is configured to be received within the guide notches/cutouts 120 so as to complete the side wall of the housing 110. The back plate 200 is then slid within the guide notches/cutouts 120 until ends 229 of the peripheral side wall 220 contact respective stops 122. It will be seen from the figures, that the mating between the main housing 110 and the back plate 200 provides a clean finished look since the portions 221 of the peripheral side wall 220 occupies the notches 120 formed along the two opposing sides of the main housing 110. The top portion of the rear wall 210 that is located above the ends 229 seats against the top portion of the rear of the main housing 110 that is located above the stops 122.

The real wall 210 of the back plate 200 thus covers the rear of the main housing 110 and thus represents the rear of the light assembly 100. To gain access to the electronics and power source, the user simply reverses the steps and slides the back plate 200 off of the main housing 110. Such action is required to change and replace the batteries.

Figure 7:
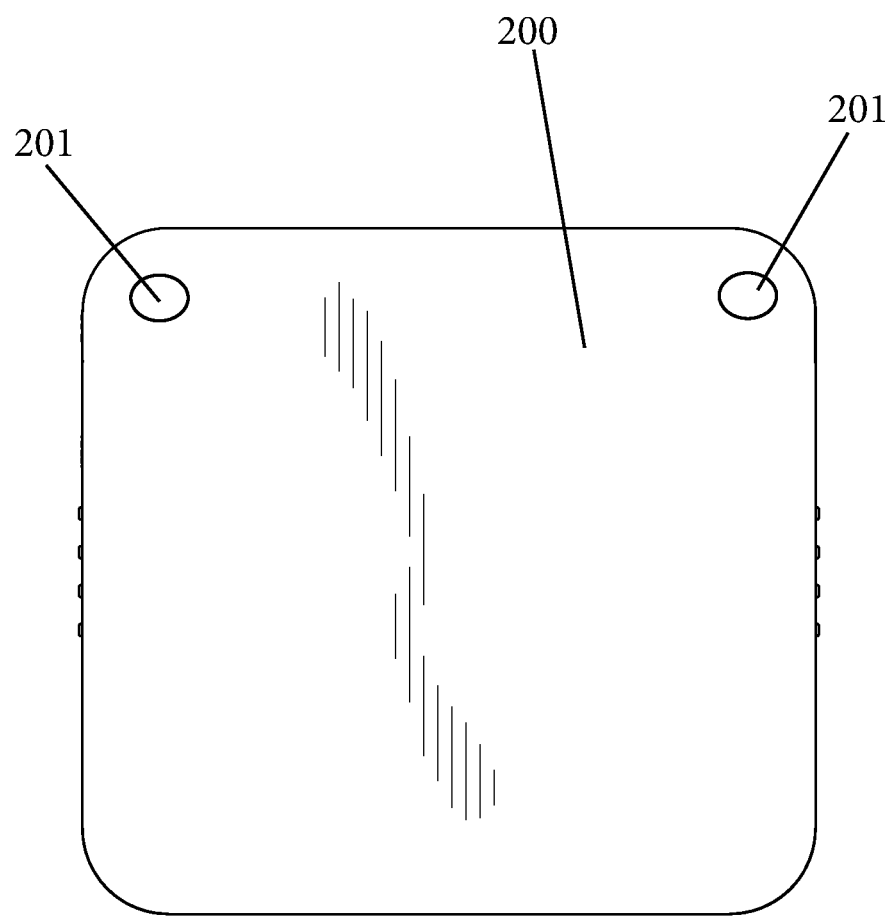
FIG. 7 is a rear elevation view of the light assembly.
Figure 8:
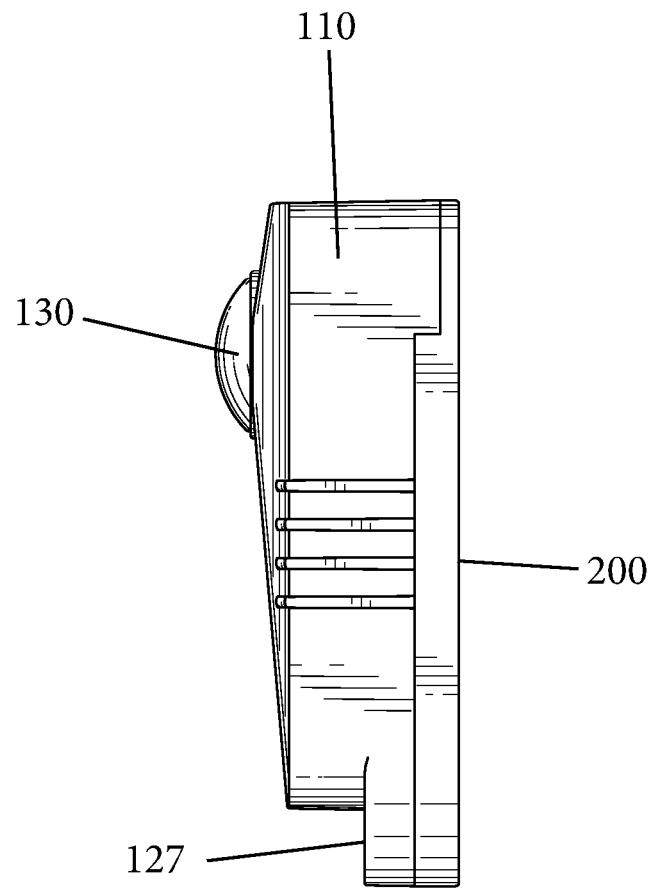
FIG. 8 is a right side elevation view of the light assembly.
Figure 9:
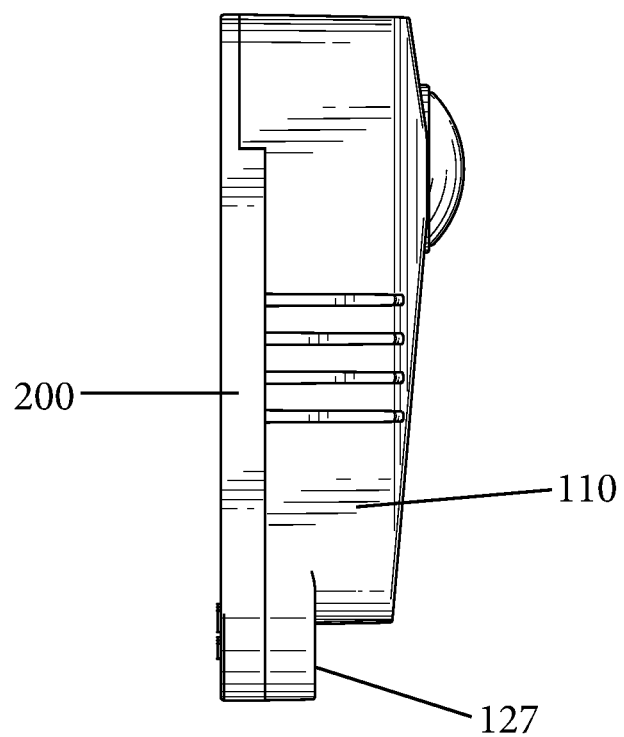
FIG. 9 is a left side elevation view of the light assembly.

To mount the back plate 200 to a support surface, the back plate 200 can contain holes 201 (FIG. 7) that receives fasteners for attaching the back plate 200 to the support surface. For example, two holes 201 can be formed in the top corners. The fasteners can be in the form of screws, nails, etc. that serve to secure the back plate 200 to the support surface.

Alternatively, along the rear face of the back plate 200 one or more adhesive pads can be provided to allow attachment of the back plate 200 to a support surface, such as a wall. The adhesive pad(s) can be a double sided pad in that a first layer of adhesive serves to attach the pad to the rear face of the back plate 200 and a second layer of adhesive has a removable release cover and is designed for being brought into contact with the support surface for attaching the back plate 200 to the support surface. Since the main housing 110 can easily be separated from the back plate 200, the back plate 200 remains in the mounted position on the support surface when the main housing 110 needs to be removed, such as for battery replacement.

FIG. 10 illustrate the alternative back plate construction and in particular, illustrate the stake type back plate 300. The stake type back plate 300 is very similar to the back plate and in fact the back plate 200 forms part of the stake type back plate 300 and therefore, like elements are numbered alike in the drawings. The stake type back plate 300 further includes a stake 310 that extends outwardly (downwardly) from a bottom edge 201 of the back plate 200. More specifically, the stake 310 extends outwardly from the rear wall 210 of the back plate 200 and is preferably integrally formed therewith.

As shown, the stake 310 is an elongate structure that has a first end 312 that attached to rear wall 210 and an opposing second end 314 that is a free end. The stake 310 can have a tapered construction in that there can be a slight inward taper in the direction toward the second end 314. This facilitates in driving the stake 310 into the ground.

The second end 314 is preferably a pointed end to facilitate driving the stake 310 into the ground. The stake 310 also can include a fluid channel 315 that is in the form of a recessed channel between extends longitudinally along the stake body. The recessed channel 315 is defined between two raised side edges 317. The recessed channel 315 is intended to allow water to drain so water does not pool behind the main light unit and damage the electronics. As shown, the recessed channel 315 communicates with the rear wall of the black plate portion against which the housing 110 seats and thus any water that may collect between the housing 110 and the back plate portion will flow by gravity into the recessed channel 315 and then flow down to the ground away from the electronics.

The stake 310 has a tapered construction and in particular, the stake 310 has an inward taper in the direction toward the second end 314. In other words, the width of the stake 310 is greatest at its upper end adjacent the rear wall 210, while the width is less near the second end 314.

The stake 310 can further include one or more and preferably, a plurality of ribs 320 formed along the outer surface of the stake 310. Each rib 320 can be a continuous structure that extends along the front, sides, and rear of the stake 310. When plural ribs 320 are provided, they are spaced from one another. The ribs 320 serve to providing the stake 310 with better gripping properties and allow the stake 310 to be better retained within the ground.

It will be appreciated that in the stake type back plate 300, the adhesive pad can be eliminated along the rear face of the back plate 200.

As mentioned, the aforementioned parts can be provided to the consumer as a kit that allows the consumer to have the choice of using the main housing 110 with either the standard back plate 200 or the stake type back plate 300. This provides great versatility to the user.

It will be appreciated that the overhang (the inner wall 125) adjacent the ledge 127 can contain a layer of material, such as a strip of material that serves to reflect the light waves. For example, a reflective plastic strip can be provided at this location and since it faces downward in use, it is not readily visible in many mounting positions of the light assembly 100.

Stake Extension

In accordance with the present invention, in some situations a longer stake is needed for suspending the light assembly 100 at the desired height relative to the ground surface. As shown in FIGS. 12-18, a stake extender (stake extension) 500 is provided for increasing the overall length of the stake that is insertable into the ground and suspends the light assembly 100. The stake extender 500 is formed of a first part 510 and a second part 520. The first part 510 is an elongated extender body having an open first end 512 and an opposing second end 514. The first part 510 can thus be a tubular structure and can come in any number of different shapes and sizes (e.g., lengths).

At or near the first end 512 of the first part 510, the body of the first part 510 can have an enlarged section generally shown at 511. In the case of cylindrical shaped tube for the first part 510, the enlarged section 511 has an annular shape. This enlarged section 511 can assist the user in separating the extender 500 from the light assembly and also serves to receive and capture the stake 310. As shown in the figures, the elongated stake 310 generally has a rectangular shape. The enlarged section 511 has a slot 513 formed therein. The slot 513 is complementary to the cross-section of the elongated stake 310 and therefore, the slot 513 can be generally rectangular shaped. The slot 513 is defined by a pair of opposing side walls 515 and a pair of opposing end walls 517. The slot 513 has a width of about X units (a first value). As mentioned before, the stake 310 has a variable width in that it has a greater width at its top portion and in particular, the maximum width of the stake 310 near the rear wall 210 is about Y units (a second value). In accordance with the illustrated embodiment, the width Y is greater than the width X. As a result, when the second end 314 of the stake 310 is inserted into the slot 513, the is sufficient room for insertion since the width Z of the stake 310 near the second end 314 is less than the width X of the slot 513 (and less than the width Y of the stake at an upper location proximate rear wall 210). When the stake 300 is continuously inserted into the interior of the first part 510, the side edges 317 of the stake 310 come into contact with the end walls 517. Continued advancement of the stake 310 results in a friction fit being formed between the stake 310 and the enlarged section 511 due to the wider portion of the stake 310 being driven into contact with the ends walls 517. This friction fit results in the secure attachment of the stake 310 to the first part 510.

To remove the stake 310 from the stake extender 500, the stake 310 is simply moved in an upward direction away from the stake extender 500. As the stake 310 moves in this direction, the contact between the side edges 317 of the stake 310 and the end walls 517 lessens and the stake 310 can rock laterally and can easily disengage from the stake extender 500.

In yet another aspect, a top surface of the enlarged section 511 has a pair of recessed portions 519 that are located at the two opposing ends of the slot 513 and more specifically, are located at the tops of the end walls 517. When fully inserted, the bottom edge 201 of the rear wall 210 seats within the recessed portions 519. The two recessed portions 519 thus provide a means for making sure that the stake 300 sits well inside of the stake extender 500 and does not move within the interior of the stake extender 500. When the bottom edge 201 seats within the recessed portions 519, the stake 310 is frictionally held within the first part 510 and is motion restricted since the bottom edge 201 is nested within the recessed portions 519.

The second part 520 has a first end 522 and an opposing second end 524. The second part 520 is formed as a stake that can be driven into the ground. The second part 520 can be defined by a plurality of blades or ribs 525 that can be arranged relative to one another. For example, the illustrated second part 520 has an X-shape that is defined by four blades 525 that are arranged at 90 degrees relative to one another.

The second part 520 has a tapered construction in that it can be inwardly tapered toward the second end 524 so as to create a pointed tip that is configured to more easily enter the ground. Near the first end 522, the second part 520 has a flange 530 that protrudes radially outward from the body of the second part 520. The flange 530 can thus be annular shaped. As discussed herein, the flange 530 can act as a stop for limiting travel of the second end 514 of the first part 510 relative to the second part 520.

As shown in FIG. 13, the first part 510 and second part 520 are jointed together by inserting the second end 514 onto the first end 522 of the second part 520 until the second end 514 makes contact with and seats against the flange 530.

The first part 510 and second part 520 can easily be disengaged from one another by pulling the two parts 510, 520 apart from one another.

The stake holder extension thus provides a means for extending the overall length of the stake in a manner in which the light assembly is still securely held in place. The structure of the stake holder extension is designed to securely hold the light assembly and limit its rocking motion (lateral movement) due to the recessed nature of the bottom edge 201 of the rear wall 210.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed:

1. A wireless light kit comprising:
a wireless light unit including:
a housing having an interior compartment that contains electronics, a power source, and a light source;
a first back plate that is configured to mate with the housing so as to cover at least a portion of the rear face of the housing and provide a mounting surface for mounting to a support surface; and
a second back plate that is configured to mate with the housing so as to cover at least a portion of the rear face of the housing, the second back plate having a stake extending outwardly therefrom and configured for insertion into a ground surface for supporting the wireless light unit above the ground surface; and
a stake extender including a first part that has a slot at a first end for receiving the stake and a second part that is configured to be detachably coupled to the first part and has a tapered second end for insertion into the ground surface.

2. The wireless light kit of claim 1, wherein along a bottom of the housing, a ledge is formed and when the housing is oriented in a vertical position, there is an inner wall adjacent to and overhanging the ledge and wherein the light source is positioned along the ledge and configured to emit light in an outward direction from the ledge, wherein the inner wall is positioned and constructed so as to deflect the emitted light in a downward direction that is away from the inner wall.

3. The wireless light kit of claim 1, wherein the stake has a tapered construction in that a top end of the stake has a greater width than a bottom end of the stake to allow a friction fit between the stake and the first part when the top end of the stake is positioned in the slot in contact with end walls defining the slot.

4. The wireless light kit of claim 3, wherein the slot is generally rectangular shaped and the stake has a generally rectangular cross-section.

5. The wireless light kit of claim 1, wherein the first part has an enlarged section at the first end, the slot being formed in a top surface of the enlarged section, the top surface having a pair of recesses formed at ends of the slot and configured to receive a bottom edge of the housing such that the bottom edge lies below the top surface of the enlarged section.

6. The wireless light kit of claim 1, wherein the second part has a plurality of longitudinal rails that are arranged at an angle relative to one another and includes a flange that extends radially beyond outer edges of the longitudinal rails, wherein when the first part and a first end of the second part is inserted into a second end of the first part until the second end seats against the flange.

7. The wireless light kit of claim 1, wherein the first part comprises a hollow tube.

8. The wireless light kit of claim 5, wherein the enlarged section is cylindrically shaped having a diameter greater than a diameter of a lower tubular portion of the first part.

9. The wireless light kit of claim 2, wherein the ledge extends from a first bottom corner to an opposing second bottom corner of the housing.

10. The wireless light kit of claim 2, wherein the inner wall is formed at a right angle relative to the ledge.

11. The wireless light kit of claim 2, wherein the inner wall extends across an entire width of the ledge.

12. The wireless light kit of claim 2, wherein the light source comprises at least one LED that is disposed within the ledge, the at least one LED being positioned and configured such that emitted light rays thereof contact and are deflected downward by the inner wall.

13. The wireless light kit of claim 12, wherein there is a plurality of LEDs that are spaced across and along the ledge.

14. The wireless light kit of claim 1, wherein the stake is inwardly tapered in a direction toward a pointed free end thereof and includes at least one rib formed along an outer surface of the stake.

15. The wireless light kit of claim 14, wherein a width of the at least one rib is less than a maximum width of the stake at an upper end of the stake.

* * * * *